Sept. 19, 1944. H. MALM 2,358,341
APPARATUS FOR PRODUCING WOMEN'S RUBBERS
Filed Oct. 19, 1942
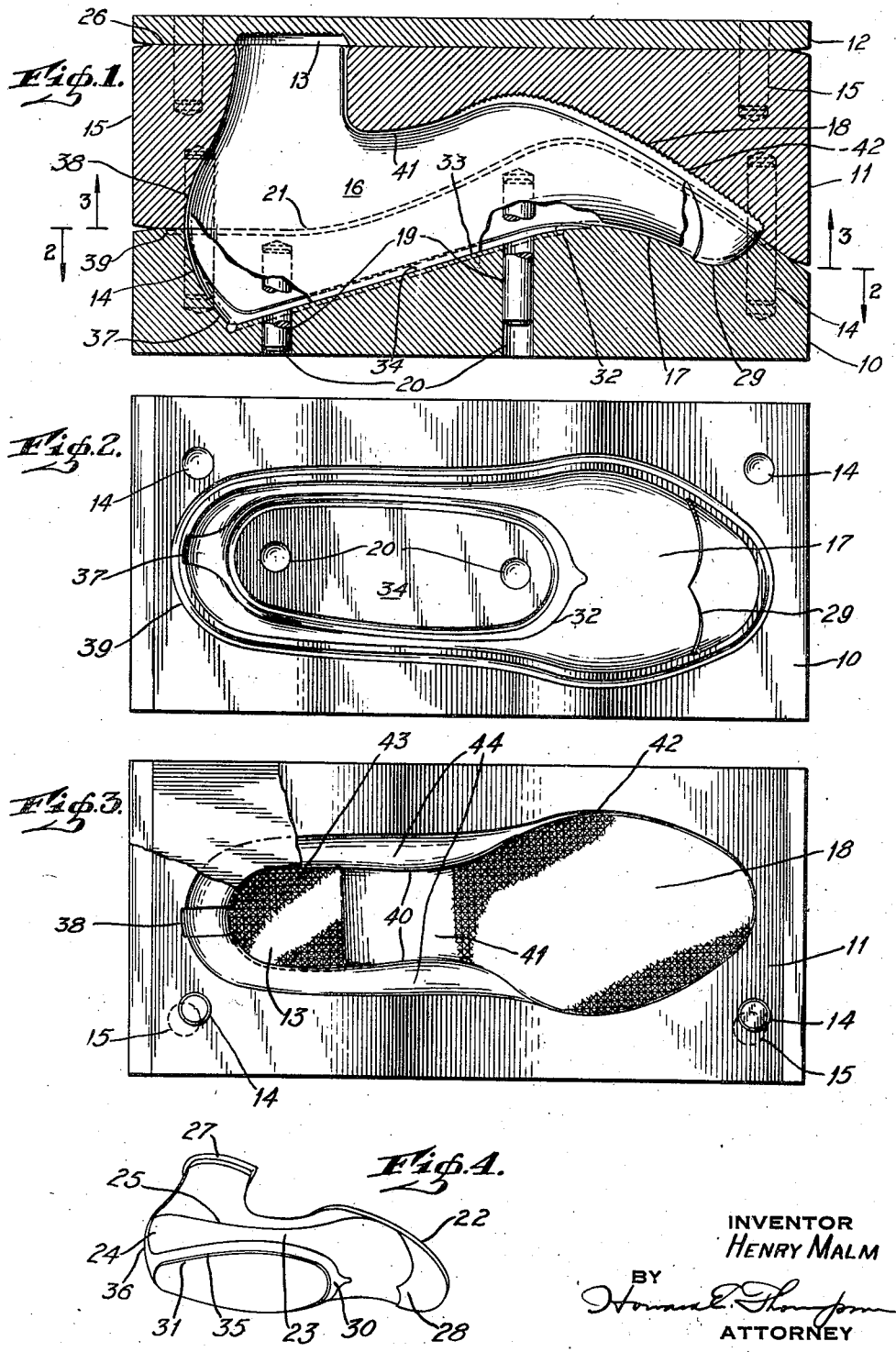
INVENTOR
HENRY MALM
BY
ATTORNEY Patented Sept. 19, 1944

2,358,341

UNITED STATES PATENT OFFICE 2,358,341

APPARATUS FOR PRODUCING WOMEN'S RUBBERS

Henry Malm, New York, N. Y.

Application October 19, 1942, Serial No. 462,637

10 Claims. (Cl. 18—42)

This invention relates to the production of women's rubbers of the type and kind which would simulate footwear generally classified as pomps, wherein the upper comprises a toe portion extending to the sides of the rubber in a relatively deep back portion and further wherein the rubber bottom comprises a sole, arch and protruding heel. More particularly, the invention relates to a novel mould construction and to the method of producing rubbers of the kind defined by the use of such moulds. Still more particularly, the invention comprises the use of three mould parts to simplify and economize on the construction of the mould, and further to simplify the method of producing the rubbers. The novel features of the invention will be best understood from the following description when taken together with the accompanying drawing, in which certain embodiments of the invention are disclosed, and in which the separate parts are designated by suitable reference characters in each of the views, and in which:

Fig. 1 is a central longitudinal section through a mould made according to my invention illustrating the last or core in full lines within the mould cavity and with part of the construction broken away.

Fig. 2 is a face view of one mould part looking in the direction of the arrows 2—2 of Fig. 1 and omitting the last or core.

Fig. 3 is a view similar to Fig. 2 showing another mould part, the view looking in the direction of the arrows 3—3 of Fig. 1 and also omitting the last or core; and Fig. 4 is a perspective view of a finished rubber shown on a reduced scale.

In carrying my invention into effect, I provide two primary die or mould parts 10 and 11; the part 10 may be said to characterize most of the upper of the rubber; whereas the part 11 characterizes the lower portion of the rubber including the sole and instep and sides of the heel. At 12 is shown a third die or mould part in the form of a plate and this plate has a cavity or impression 13 therein to form the lower portion of the heel.

The mould parts 10 and 11 are alined by pins and sockets are indicated at 14; whereas the parts 11 and 12 are alined by pins and sockets as indicated at 15 and a last or core 16 is alined within the cavities 17 and 18 of the dies 10 and 11 respectively by pins 19 secured to the core 16 and fitting in apertures 20 in the mould part 10.

The parting line between the moulds 10 and 11 is generally indicated by the reference 21 and extends from the periphery of the toe portion of the sole 22 of the resulting rubber up along the side walls 23 to the high point at the back 24 of the rubber, as indicated by the line 25 in Fig. 4 of the drawing. The line 25 actually represents an enlarged rib or bead for reinforcing the rubber. Along this line will be formed a slight flare of the rubber, which is later trimmed in finally finishing the article. A similar parting and trimming line will be formed at the parting line 26 between the moulds 11 and 12 and at the high point of the heel portion 27.

Considering Fig. 2 of the drawing, it will appear that the contour of the cavity 17 is such as to produce the desired finish, trimming and reinforcement along various portions of the upper portion of the rubber and for purposes of simplification in the present illustration, these trimmings and reinforcements have been minimized for sake of clarity.

The enlarged toe portion 28, note Fig. 4, is formed by the depression 29 in the cavity 17; whereas the enlargement 30 around the foot opening 31 of the rubber is formed by the depression 32. The opening 31 is produced by an elliptical projection 33 on the last or core 16 fitting snugly upon the elliptical table 34 of the impression 17. It is also to be noted that the enlargement 30 around the opening 31 includes a rounded or beaded edge 35 to give the required strength to this portion of the rubber to prevent tearing or rupture of the same in applying the rubber to the shoe. The heel portion of the upper is also reinforced by a rib 36 which extends from the portion 30 down to the heel 27 and part of this rib is formed by the recess 37 in the cavity 17 and the other part by a corresponding recess 38 in the cavity 18.

The mould part 10 is provided around the impression or cavity 17 proper with an encircling groove or channel 39, which is spaced slightly from the impression 17 and designed to receive surplus rubber which may flare between the parting line of the mould in the vulcanizing process.

Considering Fig. 2 of the drawing, it will appear that the cavity or impression 17 widens at the ball of the foot and is contracted at the instep portion of the foot and this contraction is materially increased, as seen by the lines 40, note Fig. 3, in the cavity 18 of the die or mould part 11. At 41 is shown the arch forming portion of the impression 18; 42 represents the sole forming portion which is characterized to give a roughened tread and a corresponding tread 43 is formed in the base of the cavity 13, which is formed in the mould plate 12. The wall portions 44 of the cavity 18 taper from the parting line downwardly in forming the contracted portions of the heel and instep.

Considering Fig. 1 of the drawing, it will appear that the portion 42 of the cavity 18 extends angularly with respect to the plane of the heel. This method of procedure shortens the side walls 23 of the rubber so that in applying the rubber to the shoe, these side walls are drawn inwardly to snugly engage the side of the shoe at the instep. The degree of this angularity will be varied in different types and styles of rubbers. Furthermore, in some instances the arched instep portion 41 may be made considerably deeper to adapt the rubber for shoes having high heels.

In that the resulting rubber footwear is composed entirely of extensible rubber and does not include any type of lining or reinforcement to check free extensibility thereof, the rubber is capable of stretching to conform with different contours and sizes of shoes within certain limits, thus minimizing the types and stylings and sizes of rubbers produced. In other words, the rubber may be produced in what may be termed low heel sizes, medium heel sizes and large heel sizes and in approximately three shoes sizes which could be small, medium and large. In some instances, by simply increasing the thickness of the mould part 12, the length of the heel may be increased. However, where drastic changes are required, a new mould part 11 will probably be required, but these parts may be made interchangeable with the part 10 in the different shoe sizes employed, thereby minimizing the number of dies or moulds required in the production of rubbers.

The last or core 16 is mounted in the cavities 13, 17 and 18 in spaced relation to the walls of the cavities, except where the projection 33 seats upon the flat surface 34, which results in forming the opening 31 in the finished product. The degree of the spacing will govern the thickness of the rubber formed in the cavities 13, 17 and 18 apart from the increased thicknesses provided by means of the contour of the cavity, as for example, at 29, 32 and the like.

In carrying out my improved method, strips or sheets of rubber are arranged upon the last or core in such manner as to provide the required thicknesses of rubber where needed, after which the core is then arranged within and between the moulds 10, 11 and 12 and these moulds are then held in firm engagement by any suitable means, after which, the rubber is vulcanized according to known practices; then the moulds 10, 11 and 12 are separated by inserting instruments through notches provided on the parting lines 21 and 26 and then the product is stripped from the last or core.

As previously stated, there will be a flare of the rubber on the finished product at positions representing the parting line between the moulds and this flare is trimmed off in suitable trimming machines, after which, the rubber is processed to give the desired finish or polish to the outer surfaces thereof in presenting the bright and finished appearance.

It will be apparent that in my novel method of producing high heeled women's rubbers, composed entirely of freely extensible rubber, the sole portion of the rubber is moulded in a position extending angularly to the heel or expressing it in another sense, where the heel is extended in an upwardly, inclined direction of the bottom of the sole, and in carrying out this method, the parting lines of the mould blocks decreases more to an ogee curve. The independent or supplemental mould plate or element is employed primarily to simplify the construction of the mould and also to adapt the primary mould to supplemental moulds of different structures, where the height of the heel, as well as contour and element thereof, may be varied.

Having fully described my invention, what I claim as new and desire to secure by Letters Patent is:

1. A mold for producing women's rubbers, said mold comprising three mold blocks, one block having a cavity defining outer surfaces of the upper portion only of the rubber, the other block seating on the first block and having a registering cavity forming the outer surfaces of the sole, the remaining part of the upper and side walls of the heel portion of the rubber, a third mold block having a cavity registering with the cavity of the second block and forming the lower part of the heel portion only of the resulting rubber, and a core supported within all of said cavities in spaced relation to the walls thereof in forming the inner surfaces of the resulting rubber and controlling thicknesses thereof.

2. A mold for producing women's rubbers, said mold comprising three mold blocks, one block having a cavity defining outer surfaces of the upper portion only of the rubber, the other block seating on the first block and having a registering cavity forming the outer surfaces of the sole, the remaining part of the upper and side walls of the heel portion of the rubber, a third mold block having a cavity registering with the cavity of the second block and forming the lower part of the heel portion only of the resulting rubber, a core supported within all of said cavities in spaced relation to the walls thereof in forming the inner surfaces of the resulting rubber and controlling thicknesses thereof, and means for alining the mold blocks and said mold part one upon the other.

3. A mold for producing women's rubbers, said mold comprising three mold blocks, one block having a cavity defining outer surfaces of the upper portion only of the rubber, the other block seating on the first block and having a registering cavity forming the outer surfaces of the sole, the remaining part of the upper and side walls of the heel portion of the rubber, a third mold block having a cavity registering with the cavity of the second block and forming the lower part of the heel portion only of the resulting rubber, a core supported within all of said cavities in spaced relation to the walls thereof in forming the inner surfaces of the resulting rubber and controlling thicknesses thereof, and means on the core adapted to seat upon the cavity surface of the first named block to form the foot opening in the rubber.

4. A mold of the class described, comprising two mold blocks collectively forming a cavity defining the contour of the major portion of the outer surfaces of a resulting rubber formed therein, said blocks having an irregular parting line extending along the walls of the upper portion of the resulting rubber intermediate the bottom and top of the rubber, a core arranged in the cavity and spaced from predetermined walls thereof in controlling the thickness of the resulting rubber and internal contour thereof, one of said blocks having a heel forming cavity opening outwardly through one surface of said block, and a supplemental mold block arranged on said surface and having a cavity registering with the heel cavity of said last mentioned block in forming the lower portion and tread surface of the heel.

5. A mold of the class described, comprising two mold blocks collectively forming a cavity defining the contour of the major portion of the outer surfaces of a resulting rubber formed therein, said blocks having an irregular parting line extending along the walls of the upper portion of the resulting rubber intermediate the bottom and top of the rubber, a core arranged in the cavity and spaced from predetermined walls thereof in controlling the thickness of the resulting rubber and internal contour thereof, one of said blocks having a heel forming cavity opening outwardly through one surface of said block, a supplemental mold block arranged on said surface and having a cavity registering with the heel cavity of said last mentioned block in forming the lower portion and tread surface of the heel, means for keying and alining the mold blocks one upon the other, and said core having a projecting elongated portion seating on a corresponding surface of the cavity of one mold block in forming the foot opening of the resulting rubber.

6. A mold of the class described, comprising two mold blocks collectively forming a cavity defining the contour of the major portion of the outer surfaces of a resulting rubber formed therein, said blocks having an irregular parting line extending along the walls of the upper portion of the resulting rubber intermediate the bottom and top of the rubber, a core arranged in the cavity and spaced from predetermined walls thereof in controlling the thickness of the resulting rubber and internal contour thereof, one of said blocks having a heel forming cavity opening outwardly through one surface of said block, a supplemental mold block arranged on said surface and having a cavity registering with the heel cavity of said last mentioned block in forming the lower portion and tread surface of the heel, means for keying and alining the molds one upon the other, said core having a projecting elongated portion seating on a corresponding surface of the cavity of one mold block in forming the foot opening of the resulting rubber, and means in the last named mold block forming an enlarged reinforcing edge on the rubber bordering said foot opening.

7. A mold of the class described, comprising two mold blocks collectively forming a cavity defining the contour of the major portion of the outer surfaces of a resulting rubber formed therein, said blocks having an irregular parting line extending along the walls of the upper portion of the resulting rubber intermediate the bottom and top of the rubber, a core arranged in the cavity and spaced from predetermined walls thereof in controlling the thickness of the resulting rubber and internal contour thereof, one of said blocks having a heel forming cavity opening outwardly through one surface of said block, a supplemental mold block arranged on said surface and having a cavity registering with the heel cavity of said last mentioned block in forming the lower portion and tread surface of the heel, the cavity of one of said blocks being enlarged to form a thickened upper toe portion on the resulting rubber, and the cavities of both of said first named blocks having registering recesses along the back of the rubber to form a reinforcing rib on the back and heel portion of the resulting rubber.

8. In molds of the class described, a mold block having a cavity defining the contour of the sole bottom, heel sides, instep portion and part of the upper of a rubber to be formed thereby, a companion mold block having a cavity registering with the cavity of the first block and defining the remainder of the upper of the rubber to be formed by said blocks, said blocks having irregular abutting surfaces defining a parting line extending along the major portion of the upper of the resulting rubber intermediate the top and bottom thereof, the heel cavity of the first named block opening through one surface of the block, and a supplemental mold block arranged upon said surface and having a cavity registering with the opening in said surface to complete the formation of the cavity forming the heel of the resulting rubber.

9. In molds of the class described, a mold block having a cavity defining the contour of the sole bottom, heel sides, instep portion and part of the upper of a rubber to be formed thereby, a companion mold block having a cavity registering with the cavity of the first block and defining the remainder of the upper of the rubber to be formed by said blocks, said blocks having irregular abutting surfaces defining a parting line extending along the major portion of the upper of the resulting rubber intermediate the top and bottom thereof, the heel cavity of the first named block opening through one surface of the block, a supplemental mold block arranged upon said surface and having a cavity registering with the opening in said surface to complete the formation of the cavity forming the heel of the resulting rubber, that part of the cavity of the first named block forming the sole bottom being angularly disposed to the surface of said block upon which the supplemental mold part is arranged, and the instep portion of said cavity being widely spaced from the parting line of said mold blocks.

10. In a mold for forming high heeled rubbers, composed entirely of rubber, a last defining the interior contour of the resulting rubber to be formed, mold blocks enveloping the last and having cavities, the walls of which are spaced from the major portion of the last in controlling contour and thickness of the resulting rubber, two of said mold blocks having an irregular parting line extending around the last intermediate the top and bottom thereof and in wide spaced relation to the heeled bottom and instep portion of the last, one of said mold blocks having an opening exposing the heel portion of the last therethrough, and a supplemental mold block on said last named mold block forming the cavity of the heel bottom of the resulting rubber.

HENRY MALM.